United States Patent
Li

(10) Patent No.: US 10,974,355 B2
(45) Date of Patent: Apr. 13, 2021

(54) CONVEYING ACCURACY RELATED FAULT DETECTABLE INTEGRATED SHEET BODY PUNCHING AND GRINDING ASSEMBLY

(71) Applicant: DONGGUAN UNIVERSITY OF TECHNOLOGY, Dongguan (CN)

(72) Inventor: Chuan Li, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 16/417,355

(22) Filed: May 20, 2019

(65) Prior Publication Data
US 2019/0389021 A1    Dec. 26, 2019

(30) Foreign Application Priority Data
Jun. 25, 2018  (CN) .......................... 201810659076.3

(51) Int. Cl.
*B23P 23/02* (2006.01)
*B26F 1/02* (2006.01)
(Continued)

(52) U.S. Cl.
CPC .............. *B23P 23/02* (2013.01); *B21D 28/04* (2013.01); *B23P 23/04* (2013.01); *B23Q 16/021* (2013.01);
(Continued)

(58) Field of Classification Search
CPC . B26F 1/02; B21D 28/04; B23P 23/02; B23P 23/04; G01N 21/89; Y10T 29/5105;
(Continued)

(56) References Cited

U.S. PATENT DOCUMENTS 2,062,044 A * 11/1936 Stoffel .................. B44B 5/0052
  72/333
3,580,120 A *  5/1971 Adams ................. B26D 7/1854
  83/98
(Continued)

FOREIGN PATENT DOCUMENTS

EP  0781635 B1 * 10/2001  ................ B26F 1/02
FR  2514271 A1 *  4/1983  ............. B21D 28/26
(Continued)

*Primary Examiner* — Erica E Cadugan
*Assistant Examiner* — Michael Vitale
(74) *Attorney, Agent, or Firm* — Law Offices of Steven W. Weinrieb

(57) ABSTRACT

The present invention relates to a conveying accuracy related fault detectable integrated sheet body punching and grinding assembly, including frame, conveying trough seat and processing frame. The processing frame is provided with a punching device and a grinding device, the frame is provided with a feed motor and feed screw. The feed screw is sleeved with a movable feed block; the movable feed block is fixedly connected with a movable feed seat, and the movable feed seat is provided with a feed lift cylinder, the feed lift cylinder is provided with a feed lift block. The feed lift block is evenly disposed with feed blocks that are capable of passing through the feed conveying trough, and a vertically oriented beam emitter is disposed on the portion that the feed lift block corresponds with the grinding device. A beam receiver is embedded in the lower surface of the grinding component of the grinding device; the present invention provides a beam emitter capable of emitting a vertical beam on the feed block corresponding to the grinding device, matching with the beam receiver disposed under the grinding head of the grinding device, which may accurately detect the feeding position of the feed block, thereby improves the punching and grinding precision of sheet bodies.

6 Claims, 7 Drawing Sheets

(51) Int. Cl.
  *B21D 28/04*    (2006.01)
  *B24B 19/00*    (2006.01)
  *B23P 23/04*    (2006.01)
  *B23Q 16/02*    (2006.01)
  *B23Q 17/22*    (2006.01)
  *B24B 1/04*     (2006.01)

(52) U.S. Cl.
  CPC ............... *B23Q 17/22* (2013.01); *B26F 1/02* (2013.01); *B24B 1/04* (2013.01); *Y10T 29/517* (2015.01); *Y10T 29/5136* (2015.01); *Y10T 29/5146* (2015.01); *Y10T 83/6476* (2015.04); *Y10T 83/9418* (2015.04)

(58) Field of Classification Search
  CPC ............ Y10T 29/5107; Y10T 29/5136; Y10T 29/5146; Y10T 29/5168; Y10T 29/517; Y10T 29/29; Y10T 29/5171; Y10T 29/5172; Y10T 29/5173; Y10T 29/5174; Y10T 29/5175; Y10T 29/5176; Y10T 83/6476; Y10T 83/83; Y10T 83/6484; Y10T 83/7487; Y10T 83/75; Y10T 83/9418; Y10T 83/9423; Y10T 83/9425; Y10T 83/9428

USPC .............. 29/26 A, 26 R, 50–56.5, 564, 565; 83/404, 405, 452, 454, 682, 684–686; 451/65, 461
  See application file for complete search history.

(56) References Cited

U.S. PATENT DOCUMENTS

| | | | | |
|---|---|---|---|---|
| 3,673,901 | A | * | 7/1972 | Vinson ................... B21D 28/04 83/14 |
| 5,259,100 | A | * | 11/1993 | Takahashi .............. B21D 28/12 29/33 J |
| 2015/0027999 | A1 | * | 1/2015 | Yamaguchi ............ B23K 37/08 219/121.44 |

FOREIGN PATENT DOCUMENTS

| | | | | |
|---|---|---|---|---|
| JP | 59094535 | A * | 5/1984 | ............. B21D 28/04 |
| JP | 06015381 | A * | 1/1994 | ............. B21D 28/04 |
| JP | 2003071661 | A * | 3/2003 | |
| WO | WO-2010140960 | A1 * | 12/2010 | ............... B26F 1/02 |

* cited by examiner

US 10,974,355 B2

CONVEYING ACCURACY RELATED FAULT DETECTABLE INTEGRATED SHEET BODY PUNCHING AND GRINDING ASSEMBLY

FIELD OF THE INVENTION

The present invention relates to the field of device integrity detection, more specifically, relates to a conveying accuracy related fault detectable integrated sheet body punching and grinding assembly.

BACKGROUND OF THE INVENTION

As a commonly used processing material, the sheet body is widely used, especially in the use of gaskets and connecting sheets. In order to achieve a better matching installation structure, gaskets are sometimes punched.

Most sheet bodies need to be grinded after being punched to grind the punched holes smoothly. Existing devices usually separate the process of punching and grinding, in this case, two devices are required for processing. Moreover, as it is necessary to reclaim, position and locate material for each device, production efficiency is low, and continuous processing cannot be achieved. In order to improve processing efficiency, there is an integrated processing device in which the conveying device for sheet body is sequentially provided with a punching device and a grinding device. But there are several defects with these devices, as it is not possible to promise fixed distance conveyance of the conveying device for a long time and as a result the processing accuracy is not enough, and defective rate is high.

OVERALL OBJECTIVE OF THE INVENTION

The overall objective of the present invention is to provide a conveying accuracy related fault detectable integrated sheet body punching and grinding assembly, at the feed block that corresponds to the position of the grinding device is provided a beam emitter capable of emitting vertical beam, and in cooperation with the beam receiver under the grinding head, it is possible to detect the feeding position of the feed block, and improve accuracy of sheet body punching and grinding.

SUMMARY OF THE INVENTION

In order to achieve the above object, the technical solutions of the present invention are as follows:

A conveying accuracy related fault detectable integrated sheet body punching and grinding assembly, including a frame and a conveying trough seat disposed on the frame; a feed trough is disposed in the middle portion of the conveying trough seat, and a processing frame is disposed on the conveying trough seat; the processing frame is sequentially provided with a punching device and a grinding device matching with the sheet body in the conveying trough seat, the frame is disposed with a feed motor and a feed screw cooperating with each other, the feed screw is sleeved with movable feed blocks, the movable feed block is connected with a movable feed seat, the movable feed seat is provided with a feed lift cylinder, the feed lift cylinder is disposed with a feed lift block; several feed blocks which can penetrate the feed trough are uniformly provided on the feed lift block, the portion of the feed lift block matching with the grinding device is provided with a vertically oriented beam emitter; the lower surface of the grinding member of the grinding device is embedded with a beam receiver that matches with the beam emitter.

Preferably, the feed block is an L-shaped block, and the length of horizontal portion thereof is consistent with the length of the sheet body; the feed block located at the punching station and the grinding station is provided with a discharging opening matching with the punching and grinding portion of the sheet body; the feed lift block is provided with a collect port which is connected with the discharging opening; the collect port is provided with a collect device; the beam emitter mounting plate of the beam emitter is fixed in the feed lift block by bolts, the upper portion of the beam emitter is flush with the lower portion of the collection port connected to the discharging opening of the grinding station, and the beam emitter can emit a vertical beam that coincides with the axis of the discharging opening. Preferably, the grinding device includes a grinding lift cylinder disposed under the processing frame, a grinding lift seat is connected to the bottom of the grinding lift cylinder; a grinding motor is disposed under the grinding lift seat, and a grinding head is disposed under the grinding motor; the grinding lift seat is located on both sides of the grinding motor and is connected with a grinding press block matching the product on the feed block by grind buffer springs; the grinding head is matched with the grinding press block, the lower portion of the grinding head is tapered, and the beam receiver is embedded in the center of the lower surface of the grinding head Preferably, the processing frame is also provided with a lift height detection device on the left side of the punching device; the lifting height detection device includes a lifting height detection cylinder disposed under the processing frame. A lift height detection block is disposed under the lift height detection cylinder, the lift height detection block is a right angle block, and the horizontal portion thereof is located at the upper left side of the vertical portion thereof; and a first contact sensor is disposed under the horizontal portion of the lift height detection block, the width of the vertical portion of the lift height detection block corresponds to that of the conveying trough seat; and the center of the vertical portion is provided with a matching port that cooperates with the conveying trough and can allow the feed block to pass, and the lower portion of the vertical portion of the lift height detection block is embedded with a second contact sensor matching the feed trough seat.

Preferably, the punching device includes a punching cylinder disposed on the processing frame, the lower portion of the punching cylinder is connected with a punching press block which matches with the sheet body on the conveying trough seat; the punching press block is provided with a punching mounting slot facing up at the bottom thereof; and the punching mounting slot is coaxial with the discharging opening provided on the feed block of the punching station, a punching device matching with the sheet body is mounted in the punching mounting slot; the punching machine includes a vertically oriented punching lift cylinder disposed in the punching mounting slot; a punching rotary motor is connected to a lower portion of the punching lift cylinder; a punching head is connected under the punching rotary motor, and a lower portion of the punching head is a circular cutter. Preferably, the collect device includes collect assembly motors disposed on the feed lift seat, and the collect assembly motors are provided on both sides of the collect port, and upper portion of the collecting assembly motors are connected with a vertically oriented collecting assembly rotary shafts; the outside of the collecting assembly rotary shafts are sleeved with a collect assembly rotating sleeves, the collect assembly rotating sleeves are disposed inside the rotating sleeve bearing housings, which are provided below the feed lift block; the outer side of the collecting assembly rotary shafts are provided with a vertical oriented rotating shaft mating sockets; the collect assembly rotating sleeves are provided with a rotating shaft mating plugs matching the rotating shaft mating socket, the lower portion of the collect assembly rotating sleeves are fixedly sleeved with collect support rotating blocks, and a collect box is disposed on the support collection blocks.

REFERENCE NUMBER KEY

The various components of the invention are denoted by the following reference numbers:
1. Frame;
2. Conveying trough seat;
3. Feed trough;
4. Sheet body;
5. Feed motor;
6. Feed screw;
7. Movable feed block;
8. Movable feed seat;
9. Feed lift cylinder;
10. Feed lift block;
11. Feed block;
12. Processing frame;
13. Punching device;
14. Grinding device;
15. Collect device;
16. Lifting height detection device;
17. Lifting height detection cylinder;
18. Lifting height detection block;
19. First contact sensor;
20. Second contact sensor;
21. Grinding lift cylinder;
22. Grind lift base;
23. Grinding motor;
24. Grinding head;
25. Beam receiver;
26. Discharging opening;
27. Collect port;
28. Mounting plate for beam emitter;
29. Beam emitter;
30. Grind buffer spring;
31. Grinding press block;
33. Punching cylinder;
34. Punching press block;
35. Punching machine;
36. Punching mounting slot;
37. Punching lift cylinder;
38. Punching rotary motor;
39. Punching head;
42. Collect assembly motor;
43. Collecting assembly rotary shaft;
44. Rotating sleeve bearing housing;
45. Collect assembly rotating sleeve;
46. Collect support rotating block;
47. Collect box;
48. Rotating shaft mating socket;
49. Rotating shaft mating plug.

DETAILED DESCRIPTION OF THE ILLUSTRATED EMBODIMENT

The present invention will be described in details below with reference to the accompanying drawings, and the description of the present invention is only exemplary and explanatory, and should not be construed as limiting the scope of the present invention.

Figure 1:
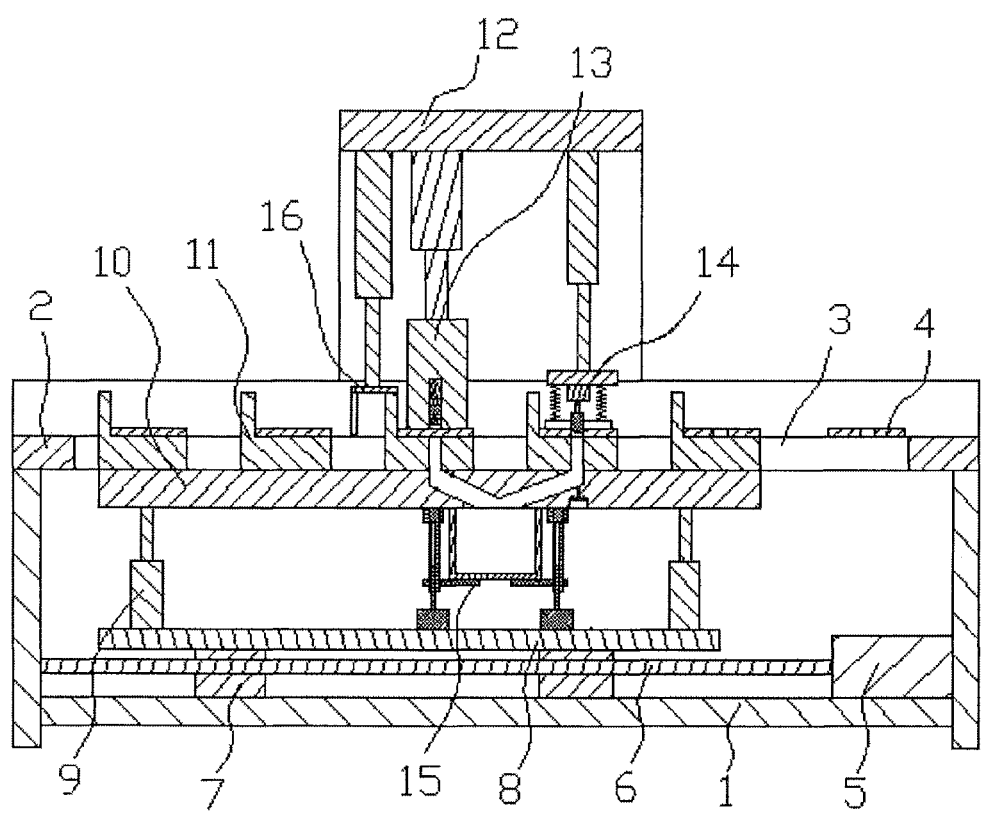
FIG. 1 is a structural schematic view of the conveying accuracy related fault detectable integrated sheet body punching and grinding assembly.
Figure 2:
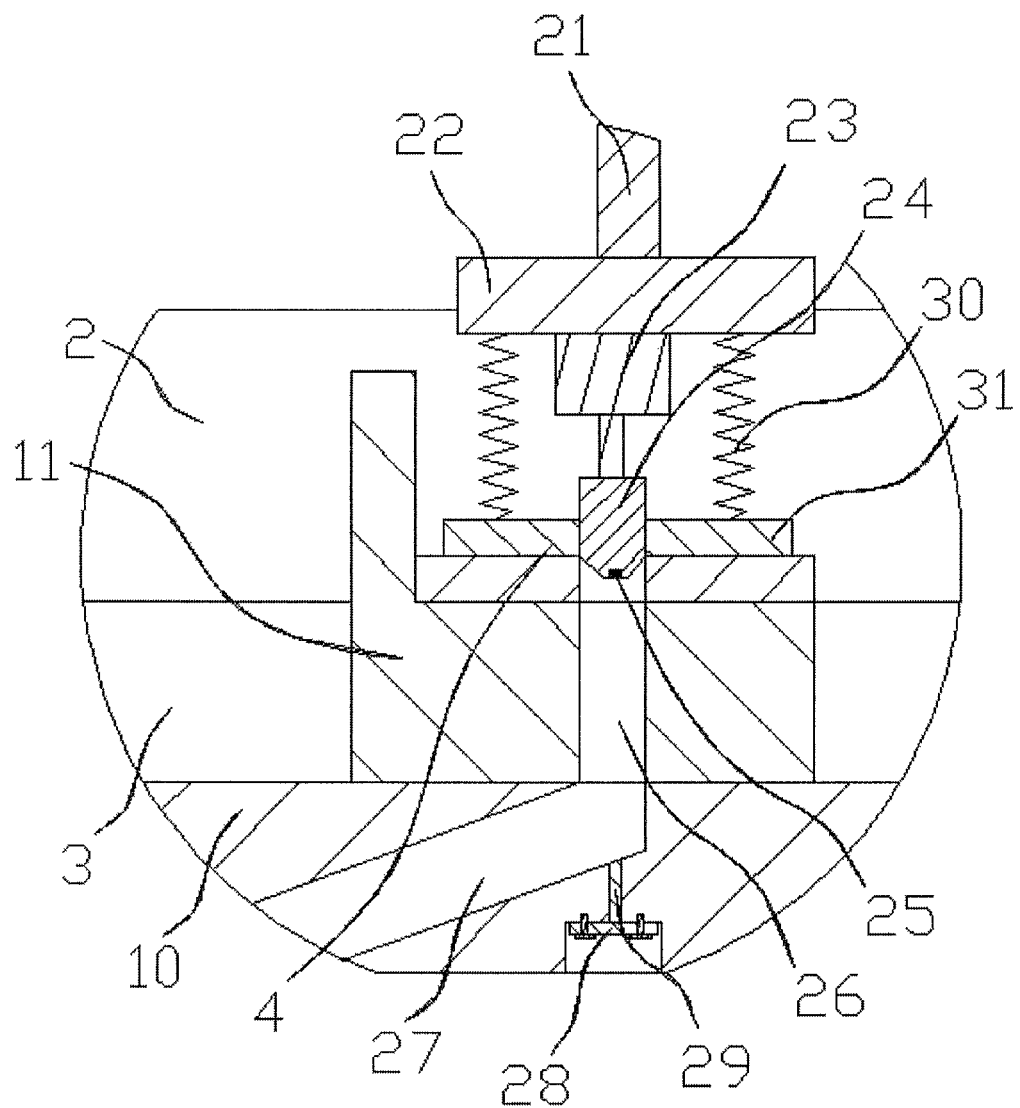
FIG. 2 is a structural schematic view of the grinding device and the feed detection portion.

As shown in FIGS. 1 and 2, the specific structure of the present invention comprises:

A conveying accuracy related fault detectable integrated sheet body punching and grinding assembly, including a frame 1 and a conveying trough seat 2 disposed on the frame 1. A feed trough 3 is disposed in the middle portion of the conveying trough seat 2, and a processing frame 12 is disposed on the conveying trough seat 2. The processing frame 12 is sequentially provided with a punching device 13 and a grinding device 14 matching with the sheet body 4 in the conveying trough seat 2, the frame 1 is disposed with a feed motor 5 and a feed screw 6 cooperating with each other, the feed screw 6 is sleeved with movable feed blocks 7, the movable feed block 7 is connected with a movable feed seat 8, the movable feed seat 8 is provided with a feed lift cylinder 9, the feed lift cylinder 9 is disposed with a feed lift block 10. Several feed blocks 11 which can penetrate through the feed trough 3 are uniformly disposed on the feed lift block, the portion of the feed lift block 10 matching with the grinding device is provided with a vertically oriented beam emitter 29. The lower surface of the grinding member of the grinding device 14 is embedded with a beam receiver 25 that matches with the beam emitter 29.

The reciprocating feeding of the feed motor 5 is used to matching the reciprocating lifting of the lift cylinder, which may realize the reciprocating feeding and lifting of the feeding block. Further, the sheet body on the feeding trough can be fed for a fixed distance, and sequentially passes through the punching device and the grinding device. The integrated punching and grinding of the sheet body greatly improves the overall processing efficiency of the sheet body. By providing a beam emitter capable of emitting a vertical beam on the feed block corresponding to the grinding device, and matching the beam receiver disposed under the grinding head of the grinding device, the feed position of the feed block can be accurately detected, and further improving the punching and grinding accuracy of the sheet body.

Figure 3:
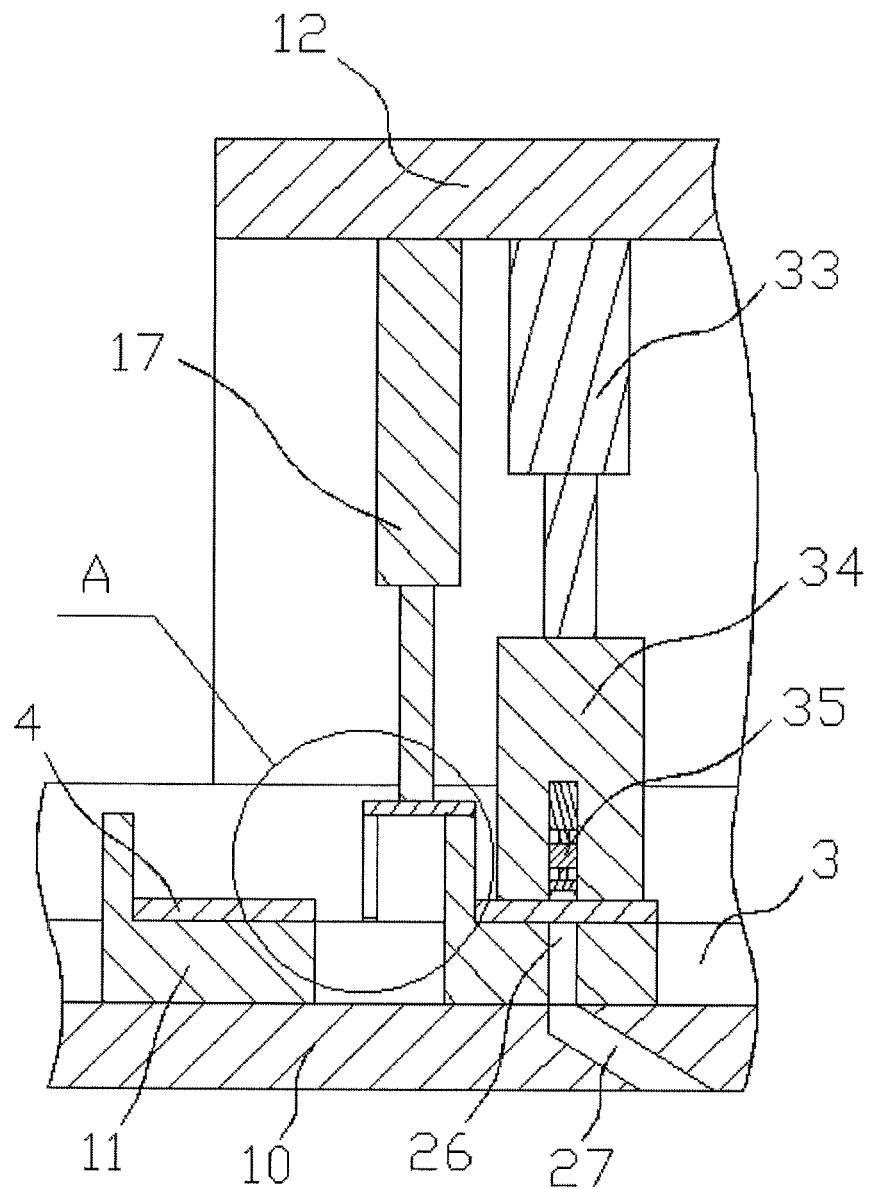
FIG. 3 is a structural schematic view of the lifting height detection device and punching device.

As shown in FIGS. 1 and 3, the feed block 11 is an L-shaped block, and the length of horizontal portion thereof is consistent with the length of the sheet body. The feed blocks 11 located at the punching station and the grinding station are provided with a discharging opening 26 matching with the punching and grinding portion of the sheet body. The feed lift block 10 is provided with a collect port 27 which is connected with the discharging opening 26; the collect port 27 is provided with a collect device 15. The beam emitter mounting plate 28 of the beam emitter 29 is fixed in the feed lift block 10 by bolts, the upper portion of the beam emitter 29 is flush with the lower portion of the collection port 27 connected to the discharging opening 26 of the grinding station. And the beam emitter 29 can emit a vertical beam that coincides with the axis of the discharging opening 36.

By developing the structure of the feed blocks, the feed block can support the sheet body, and the punching and grinding effect of the sheet body can be improved, and a discharging opening is disposed to match the collect device, and the punching and grinding reject can be collected, thereby avoids interference with the feed portion and does not affect the beam emission of the beam emitter either.

As shown in FIG. 2, the grinding device includes a grinding lift cylinder 21 disposed under the processing frame 12, a grinding lift seat 22 is connected to the bottom of the grinding lift cylinder 21. A grinding motor 23 is disposed under the grinding lift seat 22, and a grinding head 24 is disposed under the grinding motor 23. The grinding lift seat 22 is located on both sides of the grinding motor 23 and is connected with a grinding press block 31 matching the product on the feed block 11 by grind buffer springs 30. The grinding head 24 is matched with the grinding press block 31, the lower portion of the grinding head 24 is tapered, and the beam receiver 25 is embedded in the center of the lower surface of the grinding head 24.

By providing a compactable material pressing plate cooperating with the grinding head by plugging and fitting, during descending of the grinding head, interference with the material pressing part will not occur, which achieves good material holding effect for grinding.

Figure 4:
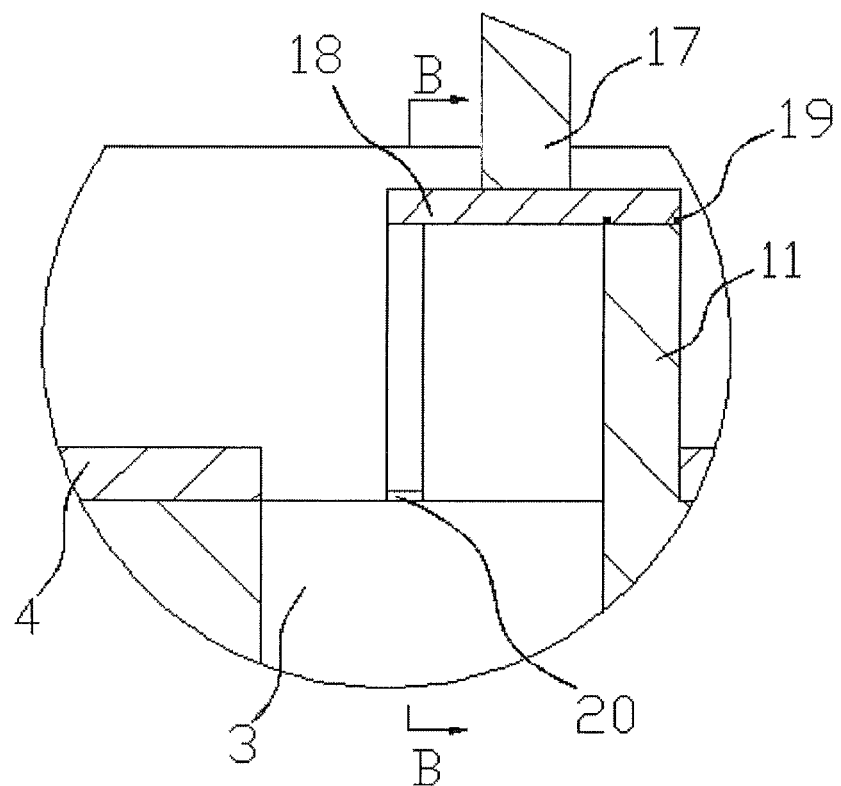
FIG. 4 is a structural schematic view of part A in FIG. 3.
Figure 5:
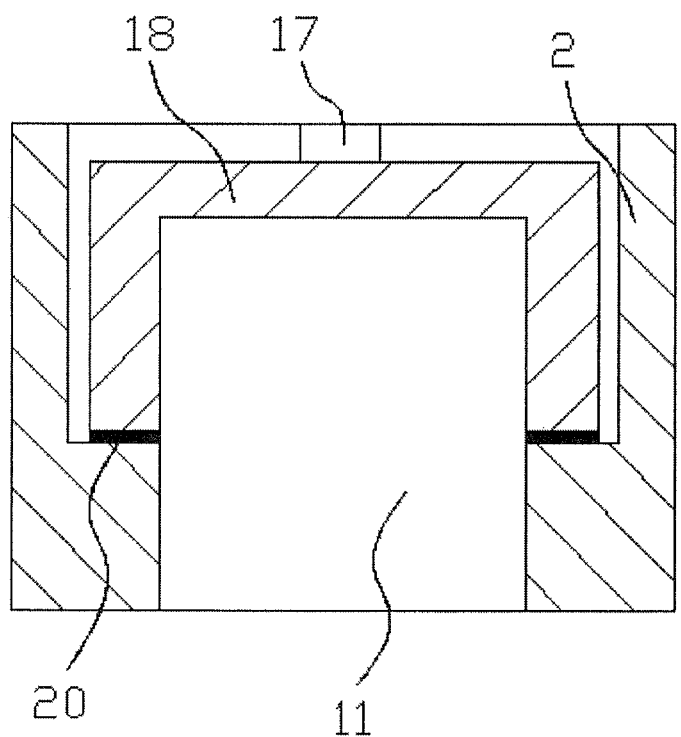
FIG. 5 is a cross-sectional view taken along line B-B in FIG. 4.

As shown in FIGS. 3-5, the processing frame 12 is also provided with a lift height detection device 16 on the left side of the punching device 13. The lifting height detection device 16 includes a lifting height detection cylinder 17 disposed under the processing frame 12. A lift height detection block 18 is disposed under the lift height detection cylinder 17, the lift height detection block 18 is a right angle block, and the horizontal portion thereof is located at the upper left side of the vertical portion thereof. A first contact sensor 19 is disposed under the horizontal portion of the lift height detection block 18, the width of the vertical portion of the lift height detection block 18 corresponds to that of the conveying trough seat 2, and the center of the vertical portion is provided with a matching port that cooperates with the conveying trough and can allow the feed block 11 to pass, and the lower portion of the vertical portion of the lift height detection block 18 is embedded with a second contact sensor 20 matching the feed trough seat 2. The structural design of the lifting height detection device may ensure that the height of the horizontal portion of the lifting height detection block is determined when the lifting height detection is performed by the second contact sensor disposed under the vertical portion of the lifting height detection block. Further, the lifting height of the feed block can be determined through whether the feed block is capable of passing through lifting height detection block and whether the first contact sensor generates an induced signal. If the feed block cannot pass the lifting height detection block, it proves that the lifting height is too high, in this case, adjustment is required to avoid that the sheet body is pressed down to deformation. If the feed block can pass the lifting height detection block, but the second contact sensor does not generate an inductive signal, the lifting height is too low, which cannot support the sheet body during punching. If the second contact sensor generates an inductive signal, it proves that the lifting of the feed block is good.

Figure 6:
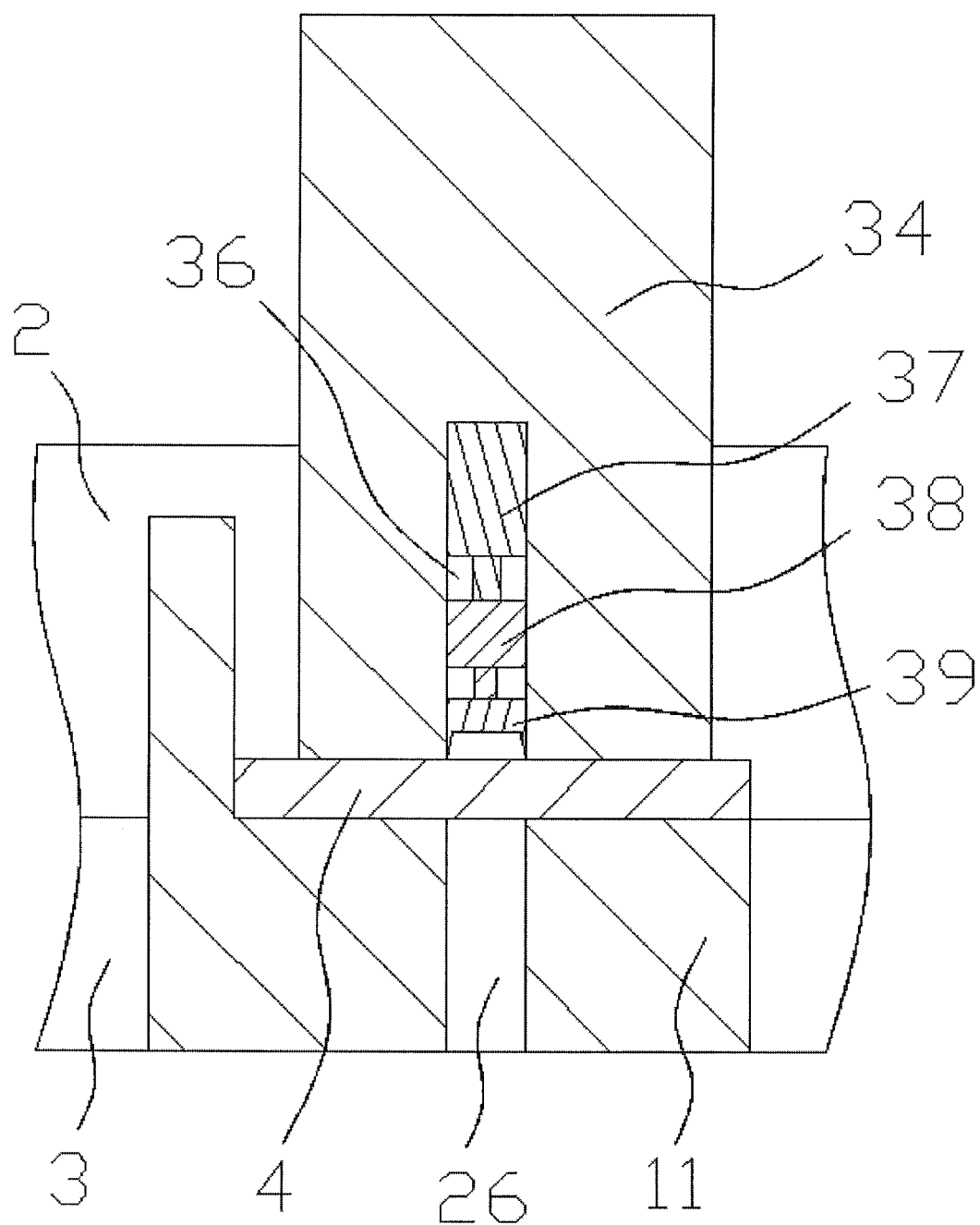
FIG. 6 is a structural schematic view of the punching machine.

As shown in FIGS. 3 and 6, the punching device 13 includes a punching cylinder 33 disposed on the processing frame 12, the lower portion of the punching cylinder 33 is connected with a punching press block 34 which matches with the sheet body 4 on the conveying trough seat 2. The punching press block 34 is provided with a punching mounting slot 36 facing up at the bottom thereof. And the punching mounting slot 36 is coaxial with the discharging opening 26 provided on the feed block 11 of the punching station, a punching device 35 matching with the sheet body 4 is mounted in the punching mounting slot 36. The punching machine 35 includes a vertically oriented punching lift cylinder 37 disposed in the punching mounting slot 36. A punching rotary motor 38 is connected to a lower portion of the punching lift cylinder 37. A punching head 39 is connected under the punching rotary motor 38, and a lower portion of the punching head 39 is a circular cutter.

Figure 7:
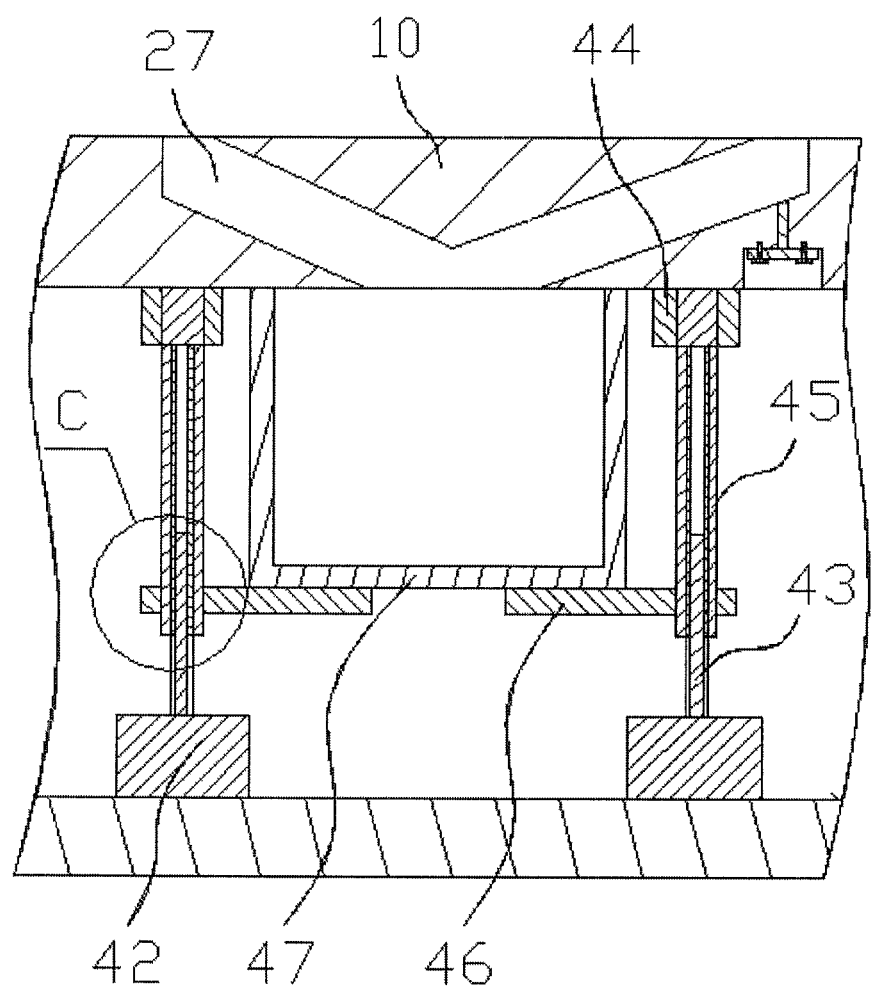
FIG. 7 is a structural schematic view of collection device.
Figure 8:
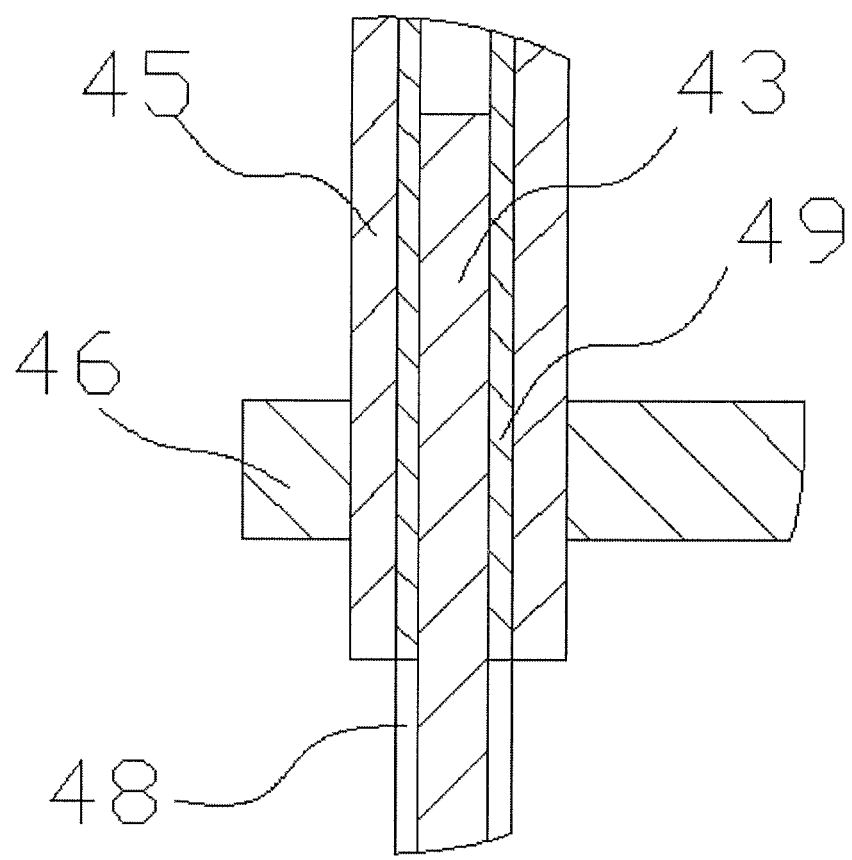
FIG. 8 is a structural schematic view of the C in FIG. 7.

The punching press block can play the role in pressing and holding the sheet body, ensuring that the sheet body does not shake during the punching process, in addition, by the design of the circular cutter at the lower part of the punching head matching the punching rotary motor rotary cutting effect is achieved As shown in FIGS. 7 and 8, the collect device 15 includes 2 collect assembly motors 42 disposed on the feed lift seat 8, and the 2 collect assembly motors 42 are provided on both sides of the collect port 27, and upper portion of the collecting assembly motors 42 are connected with a vertically oriented collecting assembly rotary shafts 43. The outside of the collecting assembly rotary shafts 43 are sleeved with a collect assembly rotating sleeves 45, the collect assembly rotating sleeves 45 are disposed inside the rotating sleeve bearing housings 44, which are provided below the feed lift block 10. The outer side of the collecting assembly rotary shafts 43 are provided with a vertical oriented rotating shaft mating sockets 48. The collect assembly rotating sleeves 45 are provided with a rotating shaft mating plugs 49 matching the rotating shaft mating socket 48, the lower portion of the collect assembly rotating sleeves 45 are fixedly sleeved with collect support rotating blocks 46, and collect box 47 is disposed on the 2 support collection blocks 46.

The collect device realizes the rotation of the support rotating block through the rotation of the collect assembly motor, thereby the support and discharge of the collect frame can be realized, which may play a good role in collecting and discharging rejects. Meanwhile, it can also guide the lifting of the feed lift block, and when feeding at left and right orientation, the movable feed seat and the feed lift block can be operated synchronously.

The overall operation of the present invention is as follows:

First, debug the assembly, and then place the sheet body 4 onto the left side of the feed trough 3 on the feed trough seat 2, after that, rotate the feed screw 6 with the feed motor 5, thereby drive the movable feed seat 8 leftwards, move the feed block 11 to the left side of the sheet body 4. Lift the feed lift block 10 with the feed lift cylinder 9, thereby lift the feed block 11 and vertical portion thereof passes through the feed trough 3. After that, drive the feed screw 6 to rotate in the opposite direction by reversing the feed motor 5, thereby drive the feed block 11 to the right. During the movement, the feed block 11 will contact the sheet body 4 and drive it to move to the right by a certain distance to complete a fixed distance movement. Subsequently, repeat the positioning of the sheet body and fixed distance movement process. During the fixed distance transportation process, the first sheet body is fed to the punching station by the feed block 11 cooperating with the punching station. Emit a beam with the beam emitter 29, if the beam is received by the beam receiver 25, it means that the left and right feeding of the feed block is accurate, if the beam is not received, it proves that the feeding of the feed block is not accurate and the feed block needs to be maintained.

Then, drive the punching press block 34 downwards with the punching cylinder 33 press against the sheet body 4, and then drive the punching head 39 to rotate by the punching rotary motor 38. Then, the punching head 39 is driven to descend by the punching lift cylinder 37, further, the circular cutter rotating under the punching head 29 will cut the sheet body 4, and then stop rotating. The punching head 39 is driven by the punching lift cylinder 37 to press vigorously to complete the punching, the punched waste is dropped from the discharging opening 26 through the collecting port 27 into the collecting frame 47 for collection, and the punching process is completed. Then, return the punching device 13 to original position thereof, and then the next sheet body is conveyed to the punching station by repeated left and right and lifting and declining movement of the feed block 11, and convey the punched sheet body to the grinding station. The grinding device 14 drives the grinding lift seat 22 to descend through the grinding lift cylinder; thereby the grinding press block 31 presses the sheet body in position. After that, the grinding motor 23 drives the grinding head 24 to rotate, cooperates with the lifting of the lift cylinder 21 to complete grinding, and then the above process is repeated until the sheet body is completely processed. After processing for a certain period of time, descend the lifting height detection block 18 by the lifting height detection cylinder 17, thereby the second contact sensor 20 is in contact with the bottom of the conveying trough seat 2 to generate an induction signal. In subsequent feeding process, the height of the feed block can be determined by checking whether the feed block is capable of passing under the lifting height detection block and whether the first contact sensor generates an induced signal. If the feed block cannot pass, it means that the lifting height is too high, in this case, adjustment is required to avoid that the sheet body is pressed too much and deform. If the feed block can pass the lifting height detection block but the second contact sensor does not generate an inductive signal, the lifting height is too low, in this case, the feed block cannot support the sheet body properly during punching process. If the second contact sensor generates an inductive signal, it proves that the lifting height of the feed block is proper.

When the waste collected in the collecting frame 47 reaches a certain amount, the collect support rotating block 46 is rotated to open by the rotation of the collect assembly motor 42, thereby the collect box 47 can be removed. In the process of feeding and lifting, the collect assembly rotating sleeve 45 can lift and decline against the collecting assembly rotary shaft 43 without affecting the lifting of the feed lift block.

It is to be understood that the term "includes", "including" or any other variants thereof is intended to encompass a non-exclusive inclusion, such that a process, method, article, or device that comprises a plurality of elements includes not only those elements. It also includes other elements that are not explicitly listed, or elements that are inherent to such a process, method, item, or device.

The principles and embodiments of the present invention have been described herein with reference to specific examples, and the description of the above examples is only to aid in understanding the method of the present invention and its core idea. The above description is only a preferred embodiment of the present invention, and it should be noted that due to the finiteness of the textual expression, there is an infinitely specific structure objectively, and those skilled in the art can not deviate from the principle of the present invention. In the following, several modifications, retouching or variations may be made, and the above technical features may be combined in an appropriate manner; these improvements, retouching, variation or combination, or unmodified, directly apply the inventive concept and technical solution to other occasions. All should be regarded as the scope of protection of the present invention.

What is claimed is:

1. A conveying accuracy related fault detectable integrated sheet body punching and grinding assembly, comprising:
   a frame;
   a conveying trough seat disposed upon said frame and upon which a sheet to be punched is mounted above a feed trough defined within said conveying trough seat;
   a processing frame disposed upon said conveying trough seat and having a punching device disposed at a punching station for punching a hole within the sheet, and a grinding device disposed at a grinding station for grinding internal peripheral portions of the hole punched within the sheet by said punching device;
   a feed motor operatively connected to a feed screw which is sleeved within a plurality of movable feed blocks;
   said plurality of movable feed blocks are operatively connected to a movable feed seat;
   said movable feed seat is provided with a feed lift cylinder which is operatively connected to a feed lift block;
   a plurality of feed blocks, which are movable through said feed trough, are disposed upon said feed lift block for moving the sheet between said punching station and said grinding station;
   a vertically oriented beam emitter is mounted within said feed lift block for emitting a beam signal; and
   a beam receiver is mounted within said grinding device so as to receive said beam signal from said beam emitter and thereby ensure that the sheet is precisely positioned with respect to said punching device such that the hole may be accurately punched within the sheet.

2. The conveying accuracy related fault detectable integrated sheet body punching and grinding assembly of claim 1, wherein:
   each one of said plurality of feed blocks comprises an L-shaped block having a vertical portion and a horizontal portion having a predetermined length dimension which corresponds with a length dimension of the sheet;
   a discharging opening is defined within at least one of said plurality of feed blocks so as to receive that portion of the sheet which has been punched out from the sheet by said punching device located at said punching station;
   a collection port is defined with said feed lift block and is connected with said discharging opening;
   a collection box is connected to said collection port for collecting portions of the sheet that have been punched out from the sheet by said punching device and conducted through said discharging opening and said collection port; and
   said beam emitter can emit a vertical beam that coincides with a longitudinal axis defined by said discharging opening.

3. The conveying accuracy related fault detectable integrated sheet body punching and grinding assembly of claim 2, wherein:
- a lift height detection device is mounted upon said processing frame within the vicinity of said punching device; wherein said lifting height detection device comprises a lifting height detection cylinder disposed beneath said processing frame, a lift height detection block operatively connected to said lift height detection cylinder and comprising an inverted U-shaped block with a horizontal portion thereof located at upper ends of vertical portions thereof;
- a first contact sensor is disposed beneath said horizontal portion of said lift height detection block;
- a width dimension of said vertical portions of said lift height detection block corresponds to a width dimension of said conveying trough seat;
- a central upper portion of said lift height detection block operatively cooperates with said feed trough so as to allow said plurality of feed blocks to pass through said feed trough; and
- second contact sensors are embedded within lower end portions of said vertical portions of said lift height detection block so as to ensure that said lift height detection block is disposed at a predetermined elevation relative to said conveying trough seat.

4. The conveying accuracy related fault detectable integrated sheet body punching and grinding assembly of claim 2, wherein:
- a pair of collection assembly motors are disposed upon said movable feed seat;
- each one of said pair of collection assembly motors has a vertically oriented upstanding assembly rotary shaft connected thereto;
- external peripheral surface portions of each one of said pair of collection assembly rotary shafts is sleeved within a collection assembly rotary sleeve;
- upper end portions of each one of said collection assembly rotary sleeves is disposed within a rotary sleeve bearing housing which is mounted upon an undersurface portion of said feed lift block;
- an external peripheral surface portion of each one of said collection assembly rotary shafts is disposed within a vertically oriented rotating shaft annular tube which includes a rotary shaft mating plug such that each one of said rotary shaft mating plugs is radially interposed between one of said collection assembly rotary shafts and one of said collection assembly rotary sleeves;
- a lower end portion of each one of said collection assembly rotary sleeves is fixedly mounted within a rotary collection support block such that said rotary collection support blocks are disposed opposite one another; and
- said collection box is mounted upon said rotary collection support collection blocks.

5. The conveying accuracy related fault detectable integrated sheet body punching and grinding assembly of claim 1, wherein:
- said grinding device includes a grinding lift cylinder disposed beneath said processing frame;
- a grinding lift base is connected to a bottom portion of said grinding lift cylinder;
- a grinding motor is disposed beneath said grinding lift base;
- a grinding head is operatively connected to said grinding motor;
- wherein said grinding lift base is operatively connected to a grinding press block which is engaged with a punched sheet disposed upon one of said plurality of feed blocks by grind buffer springs;
- said grinding head cooperates with said grinding press block so as to maintain the sheet in a stable position upon said one of said plurality of feed blocks;
- a lower end portion of said grinding head is tapered so as to facilitate engagement of said grinding head within the hole punched within the sheet; and
- said beam receiver is embedded within a central lower surface portion of said grinding head.

6. The conveying accuracy related fault detectable integrated sheet body punching and grinding assembly of claim 1, wherein:
- said punching device comprises a punching cylinder mounted upon said processing frame;
- said punching cylinder is operatively connected with a punching press block which is adapted to engage the sheet disposed upon said conveying trough seat;
- said punching press block is provided with a punching mounting slot which extends axially upward and inward from a bottom end portion of said punching press block;
- said punching mounting slot is coaxial with at least one of said discharging openings defined within at least one of said plurality of feed blocks of said punching station; and
- said punching device for punching the hole within the sheet is mounted within said punching mounting slot, and comprises a vertically oriented punching lift cylinder disposed within said punching mounting slot, a rotary punching motor operatively connected to said punching lift cylinder, and a punching head operatively connected to said rotary punching motor, wherein a lower end portion of said punching head comprises a circular cutter.

* * * * *